United States Patent [19]

Timco

[11] 4,176,469

[45] Dec. 4, 1979

[54] WAVE SIMULATOR

[76] Inventor: Gary G. Timco, 300 S. Silvery La., Dearborn, Mich. 48124

[21] Appl. No.: 890,100

[22] Filed: Mar. 27, 1978

Related U.S. Application Data

[63] Continuation-in-part of Ser. No. 852,270, Nov. 17, 1977, abandoned, which is a continuation-in-part of Ser. No. 768,297, Feb. 14, 1977, abandoned.

[51] Int. Cl.² ............................................. G09B 23/12
[52] U.S. Cl. .................................. 35/19 R; 40/406; 273/145 C
[58] Field of Search .................... 35/19 R, 41; 40/406; 92/98 R, 104; 128/142; 220/359; 272/8 R, 8 D, 26, 54; 273/1 L, 145 C, 145 CA, 146, DIG. 1

[56] References Cited

U.S. PATENT DOCUMENTS

| | | | |
|---|---|---|---|
| 484,115 | 10/1892 | Saxton | 273/145 C |
| 1,045,791 | 11/1912 | Hodge | 92/104 X |
| 1,701,842 | 2/1929 | Fisch | 272/26 X |
| 2,111,168 | 3/1938 | Chansor | 92/104 X |
| 2,220,905 | 11/1940 | Johnson | 128/142 UX |
| 2,646,063 | 7/1953 | Hayes | 92/104 X |
| 2,731,747 | 1/1956 | Hazelroth | 40/406 |
| 3,137,080 | 6/1964 | Zang | 35/41 |
| 3,400,932 | 9/1968 | Conrad | 273/146 |
| 3,525,454 | 8/1970 | Frederiksen | 220/359 |
| 3,561,022 | 2/1971 | James | 272/54 X |
| 3,613,264 | 10/1971 | Vitka | 35/19 R |
| 3,629,958 | 12/1971 | Olson | 35/19 R |
| 3,940,142 | 2/1976 | Hinz | 273/1 L X |
| 4,085,533 | 4/1978 | Ewald | 40/406 |

FOREIGN PATENT DOCUMENTS

| | | | |
|---|---|---|---|
| 1055969 | 4/1959 | Fed. Rep. of Germany | 92/104 |
| 233274 | 5/1925 | United Kingdom | 272/54 |

OTHER PUBLICATIONS

"Polycarbonate Plastics", Machine Design Magazine for Nov. 26, 1959, pp. 152–154.

Primary Examiner—Harland S. Skogquist
Attorney, Agent, or Firm—Reising, Ethington, Barnard, Perry & Brooks

[57] ABSTRACT

A wave simulator including an enclosed receptacle filled with non-mixing liquids so that tipping of the receptacle simulates wave action and incorporating at least one flexible diaphragm that flexes to prevent excessive liquid pressure buildup within the receptacle while also maintaining the interior of the receptacle completely filled by the liquids. The receptacle has a two-piece construction injection molded from clear polycarbonate plastic and includes a unitary bottom wall and an upper wall member having unitary top, side, and end walls. Edges of the bottom wall are secured to the side and end walls of the upper wall member and an intermediate portion thereof includes a pair of openings which respectively receive a pair of the diaphragms. One preferred construction of the diaphragm includes annular steps that extend upwardly so as to be flexible downwardly to accommodate for liquid expansion.

8 Claims, 13 Drawing Figures

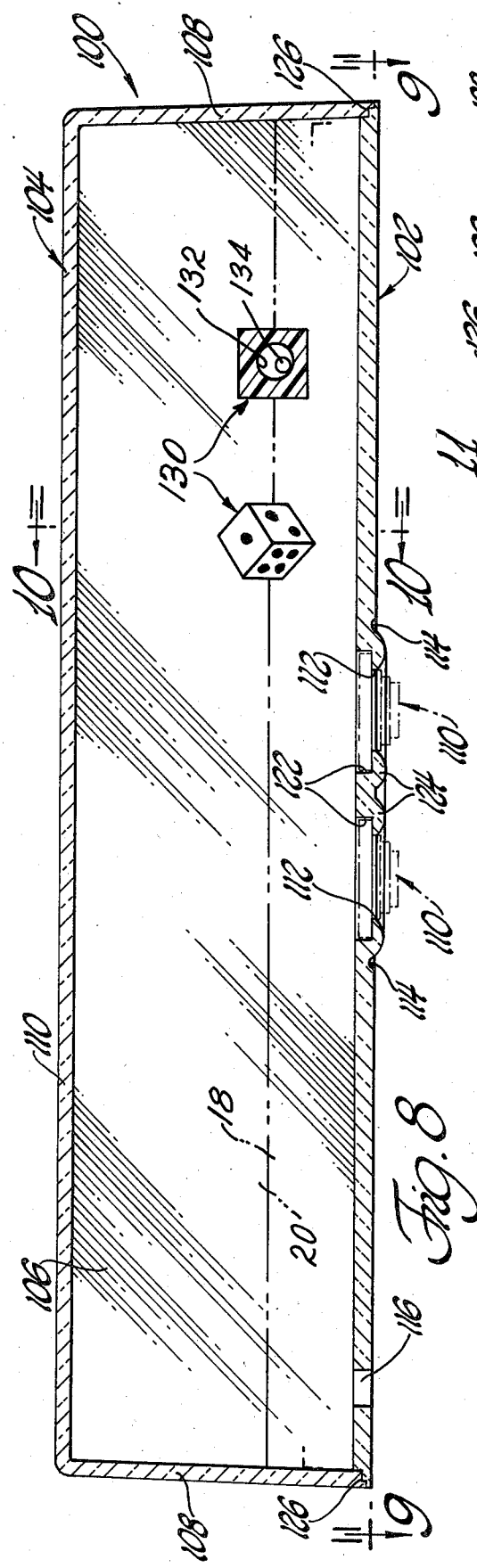
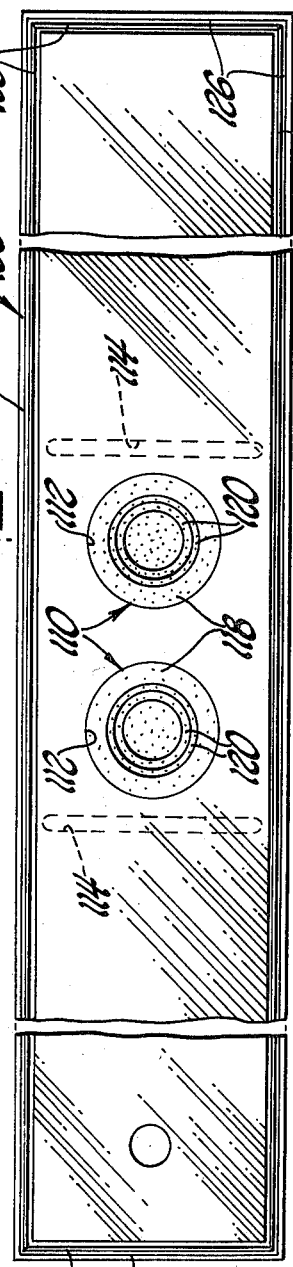
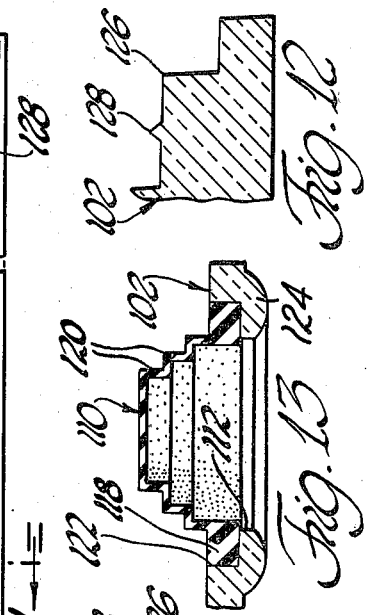
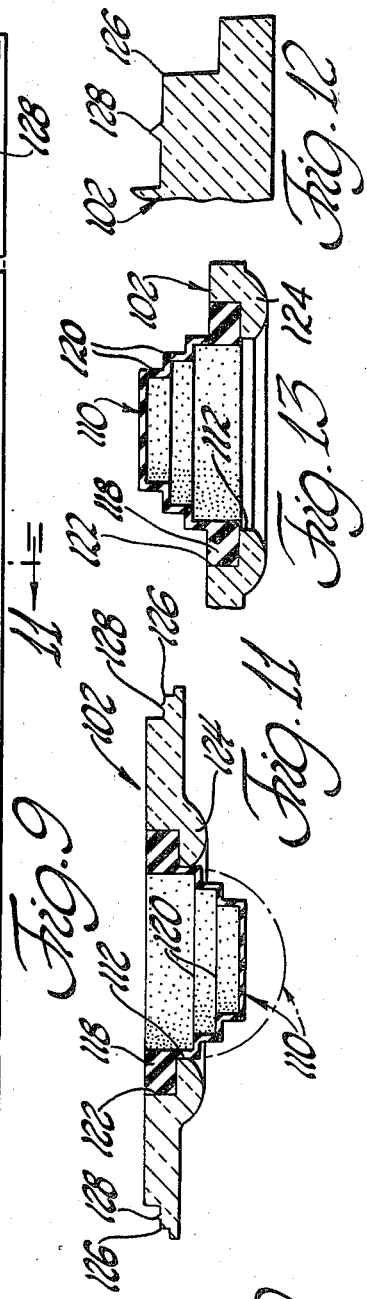
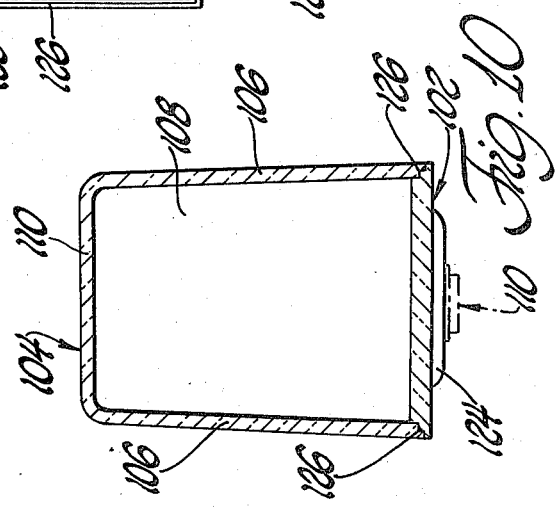

WAVE SIMULATOR

This application is a continuation-in-part of the pending prior U.S. patent application Ser. No. 852,270 which was filed on Nov. 17, 1977 as a continuation-in-part of prior U.S. patent application Ser. No. 768,297, filed Feb. 14, 1977 both now abandoned, the entire disclosure of both of said prior applications being hereby incorporated by reference.

TECHNICAL FIELD

This invention relates to a wave simulator for providing a visual appearance of wave action.

BACKGROUND ART

The U.S. patents of Bugg U.S. Pat. No. 3,475,834 and Vitka et al U.S. Pat. No. 3,613,264 disclose liquid containers which are tipped to provide liquid movement simulating wave action. In the Vitka et al patent, the liquid container is in the form of an enclosed receptacle that receives two different weight, non-mixing liquids for use in simulating wave action. A lower heavier liquid layer within the receptacle consists of water and alcohol with the alcohol consisting of between 0% and 15% by volume and with the rest of water. The upper, lighter liquid layer is formed of mineral oil and a fluorinated hydrocarbon in the form of either fluorochloromethane or fluorochlorethane. A surfactant is also utilized at the interface between the two liquid levels.

In the Vitka et al patent, the receptacle has an opaque end including a partition within the receptacle interior used for trapping a small amount of air that accommodates for thermal expansion of the liquids. The construction of the receptacle is an extruded acrylic resin tubing with a height of about 3" and a width of about 2-2 ½". When using any extruded material, one is limited in two ways. First, complete crystal clarity is sacrificed due to extrusion lines along the walls of the receptacle. Second, the largest size which can be extruded is only about 3". It is imperative that the receptacle of a wave simulation device be of a certain minimum dimension in order to achieve a realistic interpretation of an ocean wave. In other words, with this limited receptacle size one could only hope to achieve liquid motion and not a true cresting action of an ocean wave. Both height as well as width are extremely important in providing a simulator which displays correct fluid simulation of a rolling and cresting wave.

Also, a relief model technique disclosed by U.S. Pat. No. 3,137,080 includes a container including top, side, and bottom wall elements that are welded and secured by fasteners to each other. Stacked transparent plates received in the container have markings that simulate a topographic map. Clear oil is received within the container about the transparent plates. Generally planar diaphragms of the container relieve oil pressure. This relief model is used for a completely different purpose than the wave simulators of the aforementioned Bugg and Vitka et al patents.

DISCLOSURE OF THE INVENTION

An object of the present invention is to provide an improved wave simulator including an enclosed receptacle that is injection molded from clear polycarbonate plastic with a two piece construction which is filled with non-mixing liquids for simulating wave action, and wherein at least one flexible diaphragm on a bottom wall of the receptacle has a first side acted on by the liquids within the interior of the receptacle and a second side acted on by the environmental atmosphere so as to permit inward and outward flexing of an intermediate diaphragm portion in a manner that prevents excessive liquid pressure buildup within the receptacle while maintaining the receptacle completely filled by the liquids.

Another object of the invention is to provide a wave simulator with the receptacle mounted diaphragm and in which the receptacle has 360° optical clarity.

In carrying out the above objects, the liquid receptacle includes a unitary bottom wall injection molded from clear polycarbonate plastic and a clear polycarbonate plastic upper wall member that is injection molded to include unitary top, side and end walls. Sonic welds bond edges of the bottom wall to the side and end walls of the upper wall member. Alcohol in high concentrations, preferably about 95% ethyl alcohol, and oil respectively provide upper and lower liquid layers that cooperate such that the lower layer simulates wave action. The high concentration of alcohol provides a lower layer of a specific gravity relatively close to that of the oil so that the wave action is "active." Injection molding of the unitary upper wall member from polycarbonate plastic has been found to maintain the clear optical appearance of the receptacle even when the high concentrations of alcohol are used.

Location of the diaphragm on the bottom wall positions it out of view so as to enhance the aesthetics of the wave simulator. A pair of the diaphragms are preferably utilized with each diaphragm located on the bottom wall thereof on opposite sides of a midpoint between longitudinal ends of the receptacle. Downwardly opening transverse grooves in the bottom wall are spaced from each other located on opposite sides of the diaphragms and receive movable supports that mount the receptacle for tipping movement. One longitudinal end of the bottom wall includes a fill plug assembly through which the liquids are poured into the receptacle interior.

One embodiment of the diaphragm includes round grooves that open upwardly and ridges that project downwardly. Another diaphragm embodiment has a bellows construction that allows for liquid expansion. A third diaphragm embodiment includes a round periphery and an intermediate portion with annular steps that extend vertically from the periphery. The round periphery of the third embodiment has a thicker wall construction than the steps and is adhesively bonded to the bottom wall of the receptacle. The greatest liquid expansion is permitted when the steps of this third diaphragm embodiment extend upwardly from the diaphragm periphery, although it is also possible for the steps to extend downwardly as well.

Each diaphragm opening in the bottom wall has a downwardly projecting annular rib extending thereabout and defining a recess in the bottom wall. Injection molding of the bottom wall facilitates the formation of the recess which receives the periphery of the associated annularly stepped diaphragm.

One version of the wave simulator incorporates one or more objects that float at the interface between the liquids in the receptacle. These floating objects are disclosed as being a pair of dice which roll as the receptacle tips. Each die is made from a suitable plastic with a hollow construction so as to float at the interface of the liquids. A weight such as a metal ball bearing or liquid mercury may be received within the hollow construction of each die so as to be freely movable therein and provide increased rolling action of the die as the receptacle tips.

The objects, features and advantages of the present invention are readily apparent from the following detailed description of the preferred embodiments taken in connection with the accompanying drawings.

BRIEF DESCRIPTION OF DRAWINGS

FIG. 8 is a side elevation view taken in section of another embodiment of the simulator receptacle;

FIG. 9 is a top plan view of a bottom wall of the receptacle in FIG. 8 taken along line 9—9 thereof;

FIG. 10 is a cross-sectional view of the receptacle taken along line 10—10 of FIG. 8;

FIG. 11 is a sectional view of the receptacle bottom wall taken along line 11—11 of FIG. 9 and showing another diaphragm construction;

FIG. 12 is an enlarged view of a portion of FIG. 11 showing an edge of the bottom wall of the receptacle; and FIG. 13 is a view similar to FIG. 11 showing another way of mounting the diaphragm.

BEST MODE FOR CARRYING OUT THE INVENTION

Figure 1:
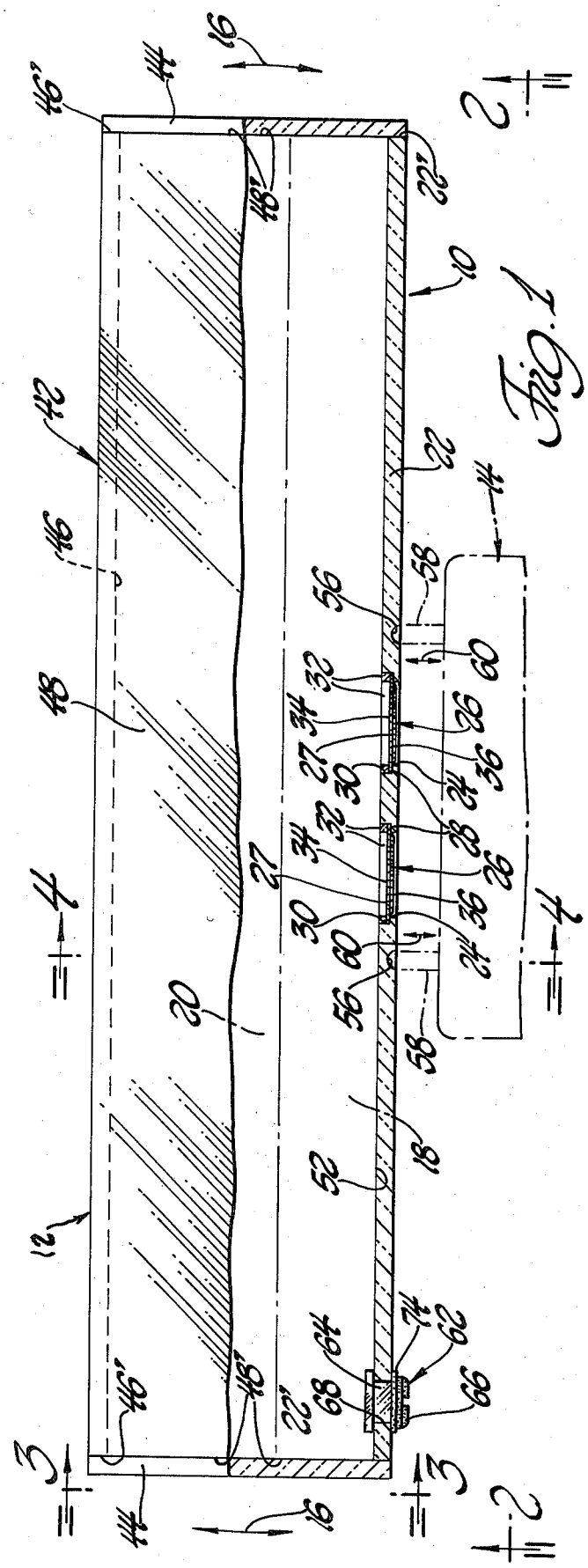
FIG. 1 is a partially broken-away side elevation view of one preferred embodiment of a wave simulator.

Referring to FIG. 1, one embodiment of a wave simulator is indicated collectively by 10 and includes an elongated liquid receptacle 12 that rests on a tipping mechanism 14 which moves the receptacle in an oscillatory manner as shown by curved arrows 16. Two non-mixing liquids 18 and 20 within the receptacle form lower and upper liquid layers, respectively, and the lower layer simulates a wave action during the tipping of the receptacle 12 by the tipping mechanism 14. Liquid 18 has specific gravity greater than that of liquid 20 so that it normally forms the lower liquid layer below the upper liquid layer formed by the lighter liquid. By way of example, liquid 18 consists of ethyl alcohol and distilled water with the alcohol constituting about 95% by volume and the distilled water 5% by volume. Liquid 20 is a clear oil, i.e. a high purity hydrocarbon solvent or an isoparaffinic solvent. Only about half as much of the heavier liquid 18 is utilized as the lighter liquid 20 so that the interface between the two liquids is located ⅓ or so of the way up the height of the receptacle. The lower liquid 18 has a suitable blue or greenish coloring agent such as food coloring added to it to make the wave action appear more realistic.

Figure 2:
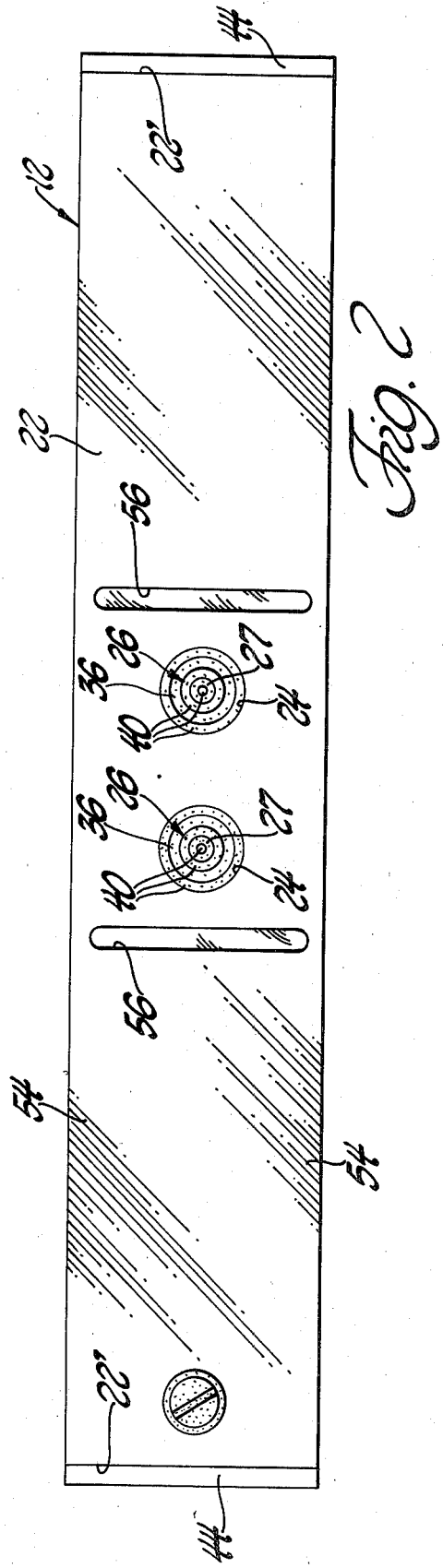
FIG. 2 is a bottom plan view of a receptacle of the simulator taken along line 2—2 of FIG. 1.
Figure 5:
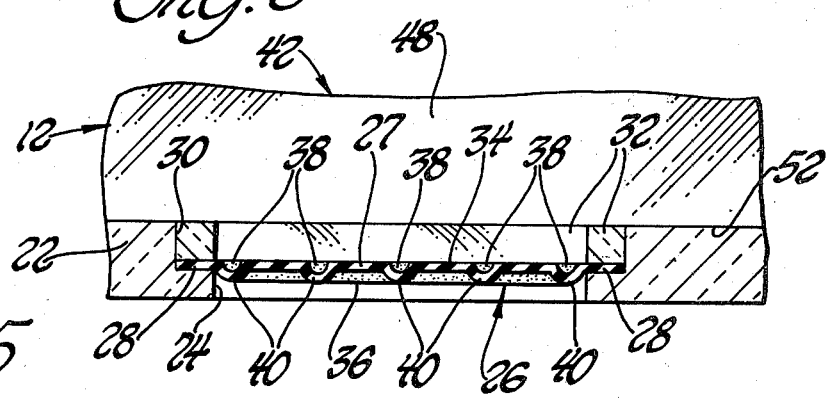
FIG. 5 is an enlarged view of a portion of FIG. 1 showing a diaphragm utilized to accommodate for thermal expansion and contraction of wave simulating liquids within the receptacle.

As seen by combined reference to FIGS. 1 and 2, a clear plastic bottom wall 22 of liquid receptacle 12 has an elongated shape and is provided with a pair of openings 24 adjacent opposite sides of its longitudinal center. Each opening 24 is closed by an associated diaphragm 26 of a round shape made from a suitable flexible material such as rubber. As best seen in FIG. 5, a round periphery 28 of each diaphragm 26 extends about an intermediate diaphragm portion 27 and is received within an upwardly facing bottom wall recess 30 that extends about the associated diaphragm opening 24 facing upwardly. During assembly, the diaphragm 26 is positioned across the opening 24 from above and its periphery 28 is then clamped by a retaining member in the form of a round retaining ring 32. With the diaphragms mounted across their associated bottom wall openings, a first side 34 of each intermediate diaphragm portion 27 faces upwardly in communication with the liquids within the receptacle. A second side 36 of each diaphragm intermediate portion 27 faces downwardly in communication with the environmental atmosphere. During thermal expansion and contraction of the liquids within the receptacle 12, fluid pressure acting on the opposite diaphragm sides 34 and 36 causes upward and downward flexing of the diaphragms in order to prevent excessive liquid pressure buildup within the receptacle while maintaining it completely filled with the liquids utilized to simulate the wave action. Diaphragms 26 incorporate the concentric upwardly facing grooves 38 on their upper sides 34 and the downwardly projecting concentric ridges 40 on their lower sides in order to permit increased outward diaphragm flexing. Also, each retaining ring 32 is preferably made from the same clear plastic as the bottom wall 22, preferably an acrylic plastic, and an epoxy glue is applied to the interengaged surfaces of the retaining ring and the associated bottom wall recess 30 in order to secure the retaining ring in position clamping the diaphragm periphery 28 in a fluid-tight manner.

Figure 7:
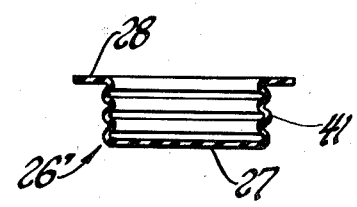
FIG. 7 is a sectional view of another embodiment of the diaphragm.

The intermediate diaphragm portion 27 can also be connected to diaphragm periphery 28 by an annular bellows 41 as shown by the diaphragm 26' in FIG. 7.

Figure 3:
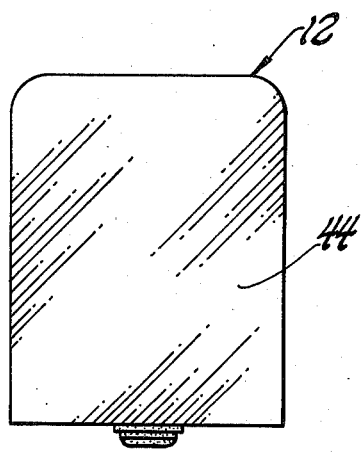
FIG. 3 is an end view of the simulator receptacle taken along line 3—3 of FIG. 1.
Figure 4:
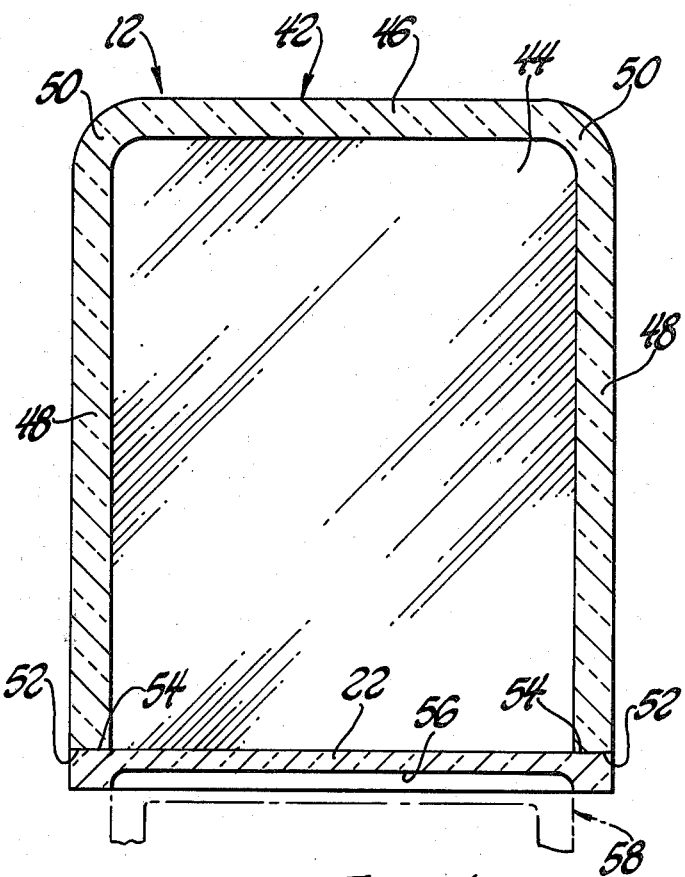
FIG. 4 is an enlarged cross-sectional view of the simulator taken along line 4—4 of FIG. 1.

With reference to FIGS. 1, 3, and 4, the elongated shape of the liquid receptacle 12 is made from clear acrylic plastic with a four-piece construction including the bottom wall 22 previously mentioned, an upper wall member 42, and a pair of end walls 44. Upper wall member 42, as seen in FIG. 4, has an inverted U shape forming a top wall 46, and downwardly projecting side walls 48 that are connected to the top wall by curved connecting portions 50 in a unitary fashion. This upper wall member and the top and side walls formed thereby is made from a planar piece that is heated and then bent to the shape shown prior to being heated to a somewhat lower temperature in order to provide stress relieving of the curved connecting portions 50. Each side wall 48 has a bottom edge 52 that is secured to a lateral edge portion 54 of the bottom wall 22 by a solvent bond that forms a strong fluid-tight interconnection during assembly. As seen in FIG. 1, bottom wall 22, top wall 46, and side walls 48 have respective end edges indicated by like primed numerals to which the end walls 44 are secured by a solvent bond of a high strength, fluid-tight nature. Good resistance to any liquid pressure within the receptacle is achieved due to the unitary construction of the top wall 46 and the side walls 48. In the area where the liquid pressure within the receptacle is greatest at its bottom, the diaphragms 26 function to prevent excessive pressure buildup at the bond between the bottom wall 22 and side walls 48.

Although two diaphragms are utilized in the preferred embodiment in order to prevent excessive liquid pressure buildup within the receptacle 12 of the wave simulator while still maintaining the receptacle completely filled with the wave simulating liquids, it should be appreciated that a single diaphragm or three of more diaphragms could likewise be utilized to provide this function. On each side of the two diaphragms, downwardly facing transverse grooves 56 in the bottom wall 22 receive upwardly projecting supports 58 of the tipping mechanism 14 so that the receptacle freely rests on the supports and can be manually removed by an upward lifting motion. Each support 58 has an inverted U shape as seen in FIG. 4 and is received within the associated bottom wall groove 56 to prevent lateral tipping of the liquid receptacle in its mounted condition. A suitable electric motor drives a reduction gear drive train of tipping mechanism 14 which in turn drives a cam that moves the supports 58 upwardly and downwardly as shown by arrows 60 of FIG. 1 in order to tip the liquid receptacle 12 in the directions shown by arrows 16 and cause the wave action of the liquids.

Figure 6:
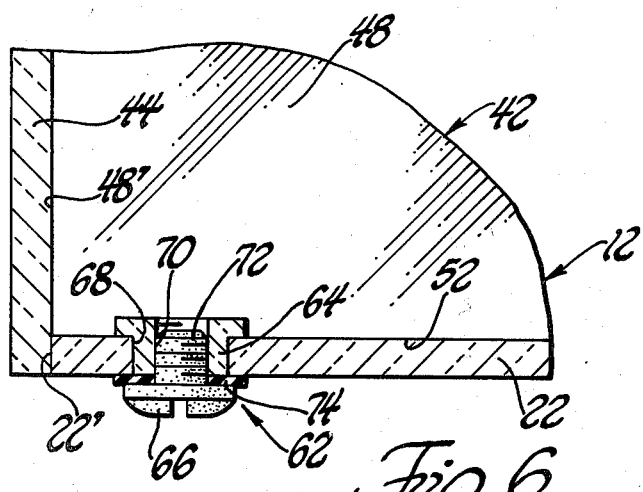
FIG. 6 is an enlarged view of a portion of FIG. 1 in section showing a fill plug assembly through which the liquids are poured into the receptacle.

As seen in FIG. 6, one end of the bottom wall 22 adjacent a bottom wall end edge 22' thereof includes a fill plug assembly 62 that incorporates a flanged insert 64 and a plug 66. Insert 64 is inserted downwardly through a plug opening 68 in the bottom wall 22 prior to the securement of the adjacent end wall to the receptacle. A threaded opening 70 within the insert 64 receives a threaded shank 72 of plug 66 in a removable manner so that a slotted head of the plug can pressurize a rubber gasket 74 about the opening while permitting the liquids which simulate the wave action to be poured into the receptacle. Of course, this pouring should take place with the receptacle laying upside down on its top wall 46 and the end incorporating the fill plug assembly 62 should be slightly raised during the pouring to completely eliminate any air bubbles from the receptacle.

In the preferred embodiment disclosed, the liquid receptacle 12 is approximately 21¼ inches long, 4¾ inches high, and 3¾ inches wide. Each of the walls has a thickness of approximately ¼ inch and the liquids 18 and 20 have the consistencies previously mentioned. Preferably, a slight amount of blue and/or green food coloring is used as the coloring agent for the heavier water and alcohol liquid 18 to provide a realistic wave action that simulates waves of the oceans, seas, and lakes. With the construction and liquids utilized, very realisitic wave action is achieved if the tipping mechanism 14 tips the liquid receptacle 12 through approximately 4.6 cycles per minute, i.e. each receptacle end moves upwardly and downwardly every 12 or 13 seconds.

With reference to FIG. 8, another embodiment of the wave simulator liquid receptacle is indicated generally by 100 and is of a two-piece construction including a bottom wall 102 that is injection molded from clear polycarbonate plastic and an upper wall member 104 that is likewise injection molded from clear polycarbonate plastic. As seen by additionally referring to FIG. 10, side and end walls 106 and 108, respectively, of wall member 104 are unitary with a top wall 110 thereof and cooperate to define the interior of the receptacle which is closed by the bottom wall 102 at its lower extremity. Side and end walls 106 and 108 have a slight taper toward each other in an upward direction to provide a draft that allows the upper wall member 104 to be injection molded.

A pair of diaphragms 110 of the receptacle 100 are seen in FIGS. 8, 9, and 11 respectively closing a pair of openings 112 through the bottom wall 102. These diaphragms function to allow expansion of the wave simulating liquids that are received with the interior of the receptacle while maintaining the receptacle completely filled with these liquids in the same manner previously discussed in connection with the other embodiment of the wave simulator. Transverse grooves 114 (FIG. 8) in the bottom wall open downwardly on each side of the diaphragms 110 as seen in FIG. 8 to receive the tipping mechanism supports, which as previously described in connection with the other embodiment, tip the receptacle to provide the wave action. Bottom wall openings 112 are located on opposite sides of a midpoint between the longitudinal ends of the bottom wall 102. At one end of the bottom wall 102, an opening 116 is provided for receiving a fill plug assembly that is used to fill the receptacle with the non-mixing liquids.

With reference to FIG. 11, each diaphragm 110 is made from a suitable rubber or rubber-like material and includes a round periphery 118 as well as an intermediate portion having a plurality of annular steps 120 that extend downwardly from the periphery. Diaphragm periphery 118 has a much greater thickness than the steps 120 and is received within a round recess 122 of the associated bottom wall opening 112. A suitable adhesive is utilized to bond the diaphragm periphery 118 to the bottom wall 102 within the recess 122 such that the diaphragm closes the opening without projecting above the upper surface of this wall to interrupt the wave action created. Expansion and retraction of annular steps 120 between the solid and phantom line indicated positions allows for the expansion and contraction of the liquids that provide the wave action. Each diaphragm is surrounded by a downwardly projecting annular rib 124 of the bottom wall which defines the opening recess 122 and partially hides the associated diaphragm.

The simulator receptacle 100 shown in FIGS. 8 through 12 has its bottom wall 102 secured to the side and end walls 106 and 108 of the upper wall member 104 by sonic welds that bond the edges 126 of the bottom wall to the side and end walls in a fluid tight manner. Bottom wall 102 has its end and side edges 126 each formed with a stepped shape that interfits with a complementary stepped shape on the lower edge of the side or end wall of the upper wall member. As best seen in FIG. 12, pointed ribs 128 on the bottom wall edges are provided to enhance the strength and seal of the sonic weld that is formed. Conventional sonic welding equipment is utilized to provide the securement of the bottom wall 102 to the upper wall member 104 with the stepped interconnection thereof forming the location of the welding.

As seen in FIG. 13, the diaphragm 110 may also be mounted with its steps 120 extending upwardly from the diaphragm periphery 122 as well as downwardly as in FIG. 11. Greater liquid expansion can be compensated when the steps 120 extend upwardly. Also, the upwardly extending diaphragm 110 will flex upwardly if the simulator is cooled after filling. Such upward flexing will maintain the receptacle completely filled with the liquids.

Injection molding the upper wall member 104 shown in FIGS. 8 and 10 from clear polycarbonate plastic provides 360° optical clarity to an observer of the simulator as it is operated. It has been found that the polycarbonate plastic is superior over acrylic plastic in resisting deterioration of the optical clarity with alcohol as one of the liquids. Even high concentration such as the 95% ethyl alcohol and 5% distilled water preferably utilized will not destroy the optical clarity of the injection molded polycarbonate plastic. Also, the injection molding of the bottom wall 102 facilitates the formation of the annular ribs 124 which are used in mounting the diaphragms. It has been found that a wall thickness of 3/16 of an inch is more than adequate for providing a receptacle of the required strength.

As seen in FIG. 8, the simulator includes at least one floating object which preferably takes the form of a pair of dice 130 that float at the interface between the alcohol and water 18 and the oil 22. Each die is preferably from plastic with a hollow construction having a center cavity 132 of an appropriate size so that the floating takes place at the liquid interface. A suitable plug (not shown) closes the cavity 132 preferably by a threaded connection. A suitable weight 134 such as a metal ball or liquid mercury is received within the cavity 132 and is freely movable therein so as to increase the rolling action of the die as the receptacle is tipped back and forth. This rolling action of the dice 130 provides an intriguing motion to the observer of the wave simulator. Dots on the die can be painted with epoxy paint so as to resist deterioration from the alcohol in the receptacle.

While preferred embodiments of the wave simulator have herein been described in detail, those familiar with this art will recognize various alternative designs and embodiments for practicing the present invention as defined by the following claims.

What is claimed is:

1. A wave simulator comprising: an enclosed receptacle of an elongated shape having an elongated interior; non-mixing liquids received within the interior of the receptacle; one of the liquids being alcohol and another being oil such that the alcohol provides a lower liquid layer that simulates wave action upon tipping of the receptacle; the receptacle having a two-piece construction including an injection molded unitary bottom wall of clear polycarbonate plastic and an upper wall member which is injection molded from clear polycarbonate plastic and has unitary top, side, and end walls; the bottom wall having edges bonded to the side and end walls of the upper wall member; at least one round opening through the bottom wall of the receptacle; the bottom wall also having a downwardly projecting annular rib extending about the opening thereof and defining a recess thereabout; a round flexible diaphragm closing the opening in the bottom wall; said diaphragm having a thickened round peripheral portion secured to the bottom wall within the recess about the opening thereof and said diaphragm also having a thinner intermediate portion with a first side that faces upwardly in communication with the liquids and a second side that faces downwardly in communication with the environmental atmosphere; and the intermediate diaphragm portion having annular steps that extend vertically from the round periphery of the diaphragm such that the intermediate diaphragm portion flexes upwardly and downwardly to prevent excessive liquid pressure buildup within the receptacle while maintaining the receptacle interior completely filled with the liquids.

2. A simulator as in claim 1 wherein the annular steps of the diaphragm extend downwardly from the periphery thereof.

3. A simulator as in claim 1 wherein the annular steps of the diaphragm extend upwardly from the periphery thereof.

4. A simulator as in claim 1 wherein there is at least one object that floats at the interface of the liquids.

5. A simulator as in claim 4 wherein there are two floating objects which comprise a pair of dice which roll as the receptacle tips.

6. A simulator as in claim 5 wherein each die is made from plastic with a hollow construction so as to float at the interface of the liquids.

7. A simulator as in claim 6 wherein each die has a weight received therein and freely movable to provide increased rolling action of the die as the receptacle tips.

8. A wave simulator comprising: an enclosed receptacle of an elongated shape having an elongated interior; non-mixing liquids received within the interior of the receptacle; one of the liquids being alcohol and another being oil which is lighter than the alcohol so that the alcohol provides a lower liquid layer that simulates wave action upon tipping of the receptacle; the receptacle having a two-piece construction including a unitary bottom wall which is injection molded from clear polycarbonate plastic and an upper wall member which is injection molded from clear polycarbonate plastic and has unitary top, side, and end walls; the bottom wall having edges that are bonded by sonic welds to the side and end walls of the upper wall member; a pair of round openings through the bottom wall of the receptacle and the bottom wall having a downwardly projecting annular rib extending about each opening and defining a recess in the bottom wall about the associated opening; a pair of flexible diaphragms respectively closing the openings in the bottom wall; each diaphragm having a thickened round peripheral portion bonded within the associated recess of the bottom wall and also having a thinner intermediate portion including a first side that faces upwardly in communication with the liquids and a second side that faces downwardly in communication with the environmental atmosphere; and the intermediate portion of each diaphragm having annular steps that extend vertically upward from the diaphragm periphery such that the intermediate diaphragm portion flexes upwardly and downwardly to prevent excessive liquid pressure within the receptacle while maintaining the receptacle interior completely filled with liquids.

* * * * *